(12) United States Patent
Bulea

(10) Patent No.: US 9,939,966 B2
(45) Date of Patent: Apr. 10, 2018

(54) LOW GROUND MASS CORRECTION MECHANISM

(71) Applicant: Synaptics Incorporated, San Jose, CA (US)

(72) Inventor: Mihai Bulea, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 843 days.

(21) Appl. No.: 14/229,559

(22) Filed: Mar. 28, 2014

(65) Prior Publication Data
US 2015/0277618 A1    Oct. 1, 2015

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC ......... G06F 3/044; G06F 3/045; G06F 3/0418
See application file for complete search history.

(56) References Cited

U.S. PATENT DOCUMENTS

| | | |
|---|---|---|
| 5,945,980 A | 8/1999 | Moissev et al. |
| 8,054,300 B2 | 11/2011 | Bernstein |
| 8,896,328 B2 * | 11/2014 | Reynolds ................ G06F 3/044 324/686 |
| 9,372,580 B2 * | 6/2016 | Simmons ................ G06F 3/044 |
| 9,632,622 B2 * | 4/2017 | Hotelling .............. G06F 3/0418 |
| 2008/0157782 A1 | 7/2008 | Krah |
| 2008/0158183 A1 | 7/2008 | Hotelling et al. |
| 2009/0160787 A1 * | 6/2009 | Westerman ........... G06F 3/0418 345/173 |
| 2009/0284495 A1 | 11/2009 | Geaghan et al. |
| 2010/0001973 A1 | 1/2010 | Hotelling et al. |
| 2010/0060608 A1 * | 3/2010 | Yousefpor ............. G06F 3/0418 345/174 |
| 2010/0164889 A1 * | 7/2010 | Hristov ................. G06F 3/0416 345/173 |
| 2010/0245286 A1 | 9/2010 | Parker |
| 2010/0292945 A1 | 11/2010 | Reynolds et al. |
| 2011/0006832 A1 | 1/2011 | Land et al. |
| 2011/0025629 A1 | 2/2011 | Grivna et al. |
| 2011/0061949 A1 | 3/2011 | Krah et al. |
| 2011/0175823 A1 * | 7/2011 | Vieta ..................... G06F 3/0412 345/173 |
| 2012/0043971 A1 | 2/2012 | Maharyta |
| 2012/0081335 A1 | 4/2012 | Land et al. |
| 2013/0173211 A1 | 7/2013 | Hoch et al. |

* cited by examiner

*Primary Examiner* — Mohamed Charioui
*Assistant Examiner* — Catherine Rastovski
(74) *Attorney, Agent, or Firm* — FBFK PC

(57) ABSTRACT

A processing system for an input device includes a sensor module coupled to sensor electrodes. The sensor module includes sensor circuitry and configured to acquire first capacitive measurements when the input device is in a first state, and acquire second capacitive measurements when the input device is in a second state. The second state has an increased ground as compared to the first state. The processing system further includes a determination module configured to determine positional information for an input object based on the first capacitive measurements and the second capacitive measurements.

6 Claims, 10 Drawing Sheets

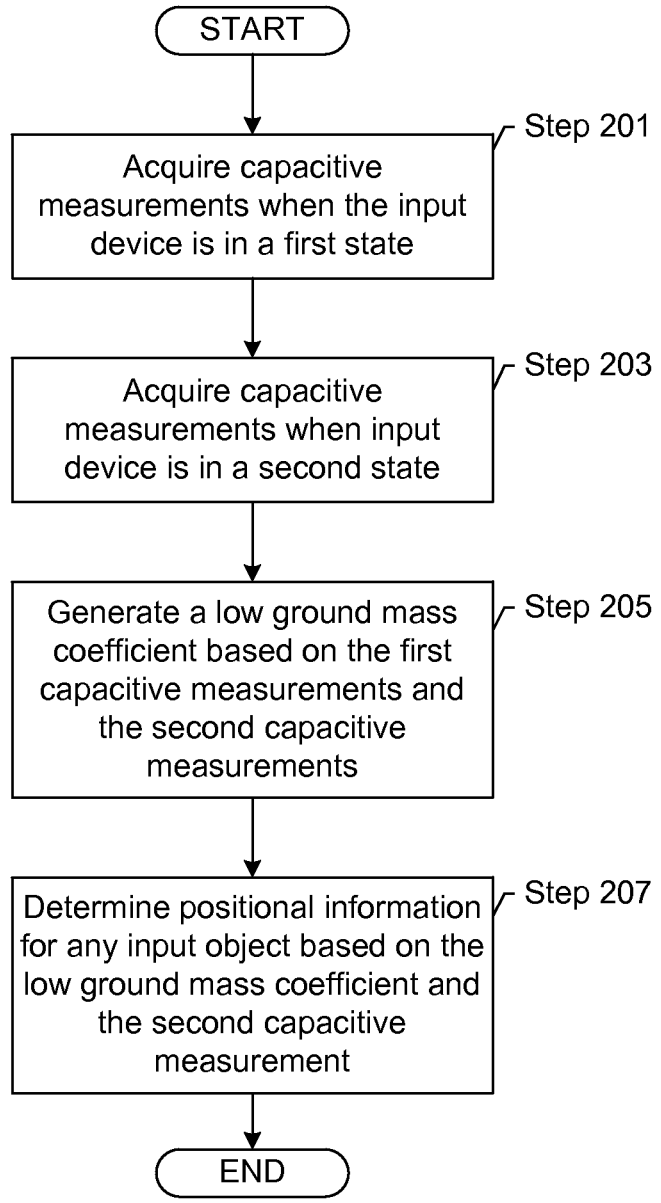
FIG. 2.1

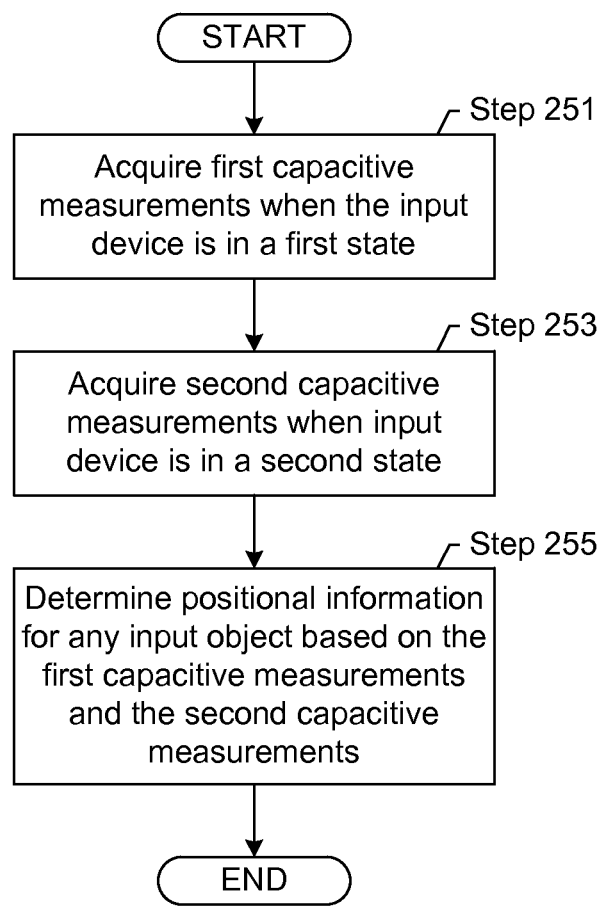
FIG. 2.2

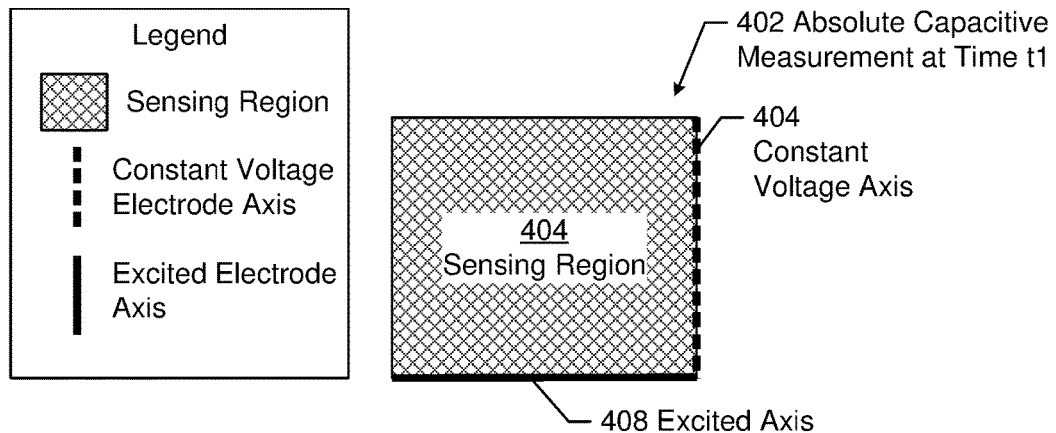
FIG. 4.1
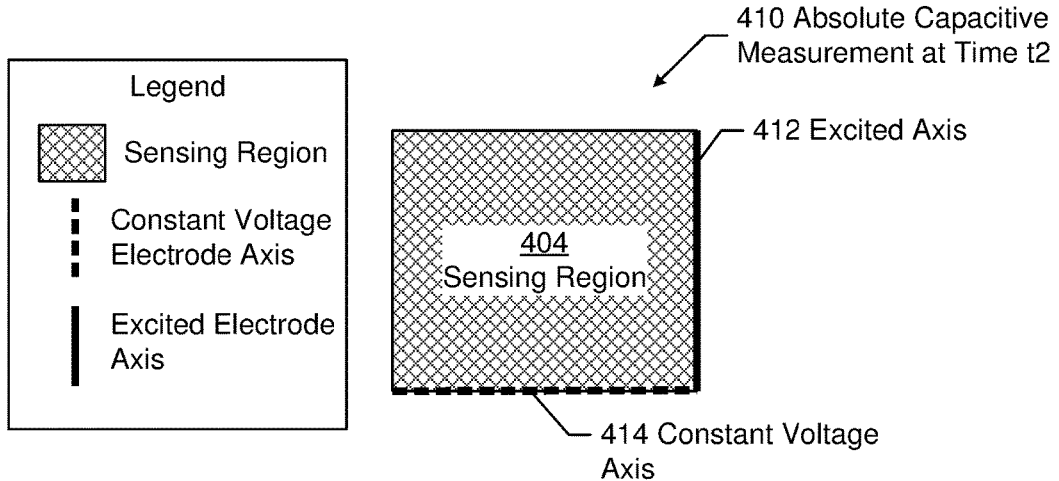
FIG. 4.2

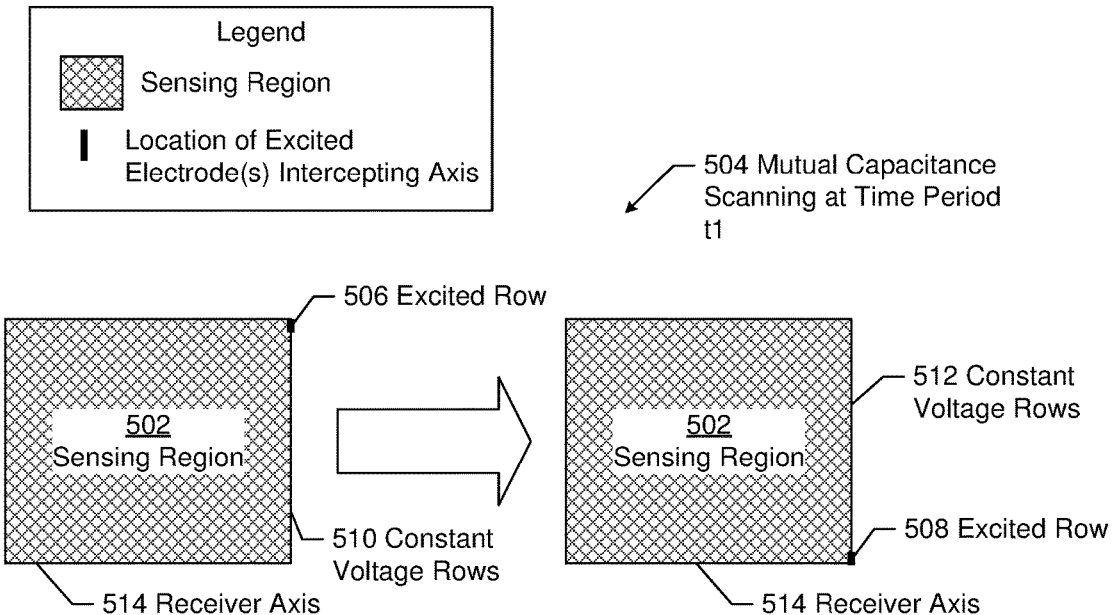
*FIG. 5.1*
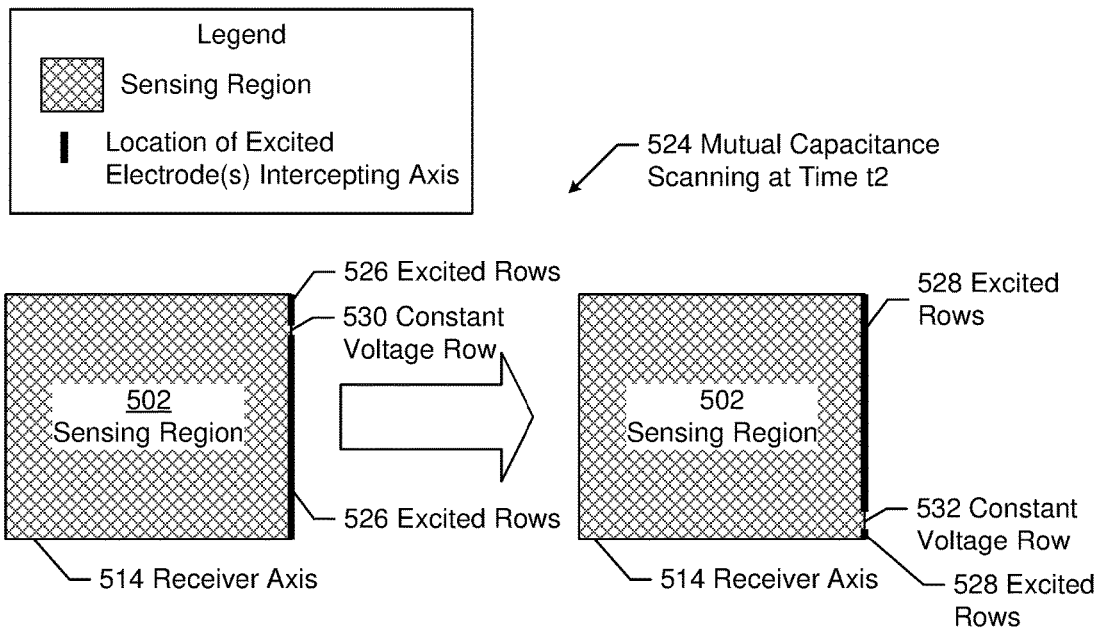
*FIG. 5.2*

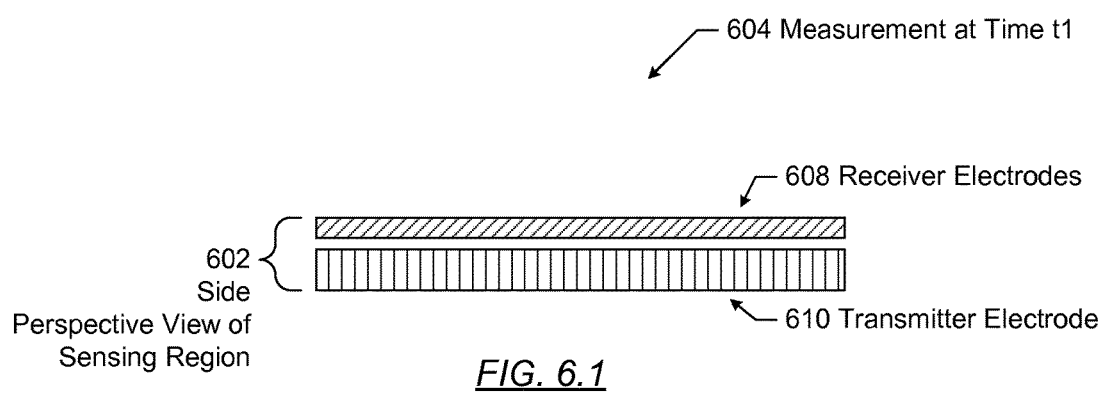
FIG. 6.1
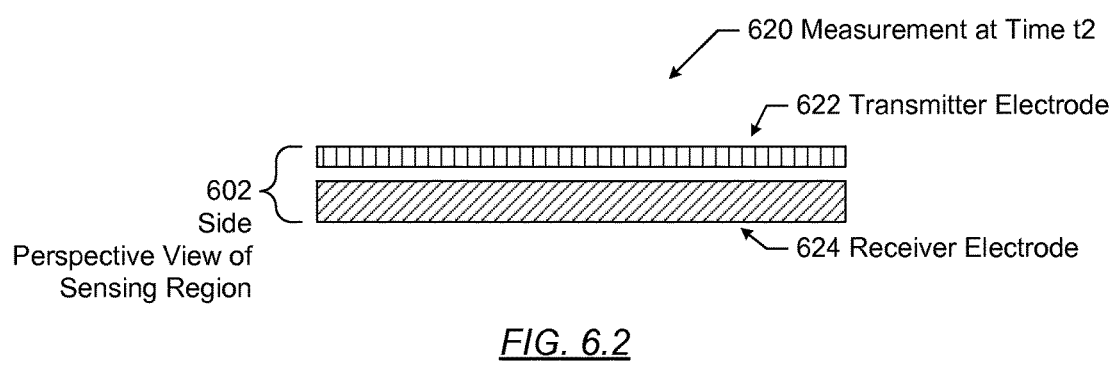
FIG. 6.2

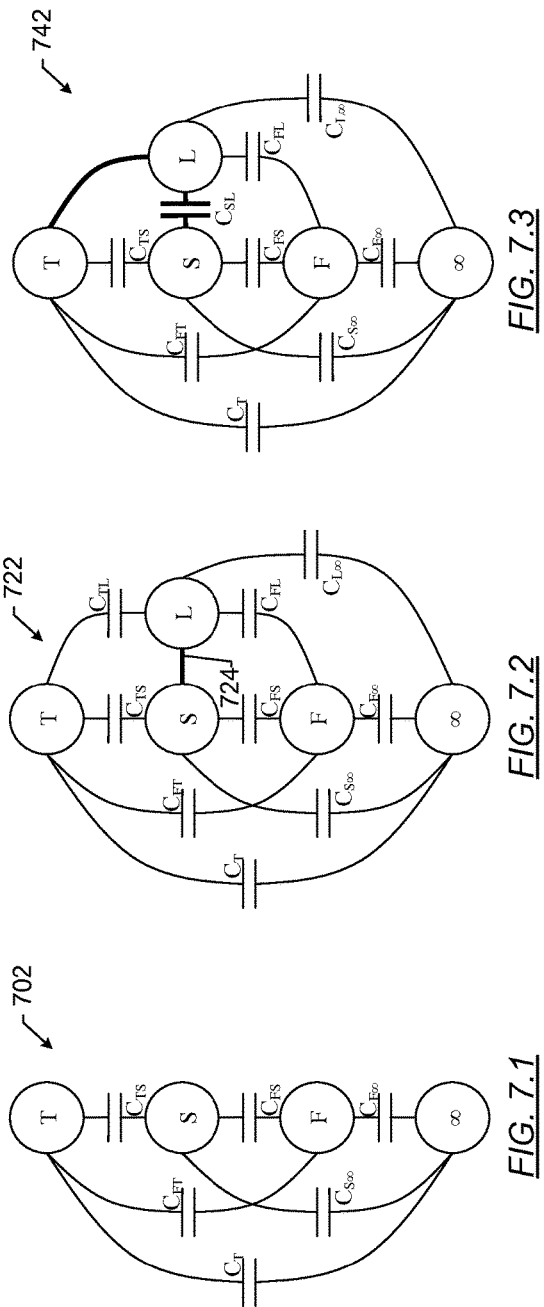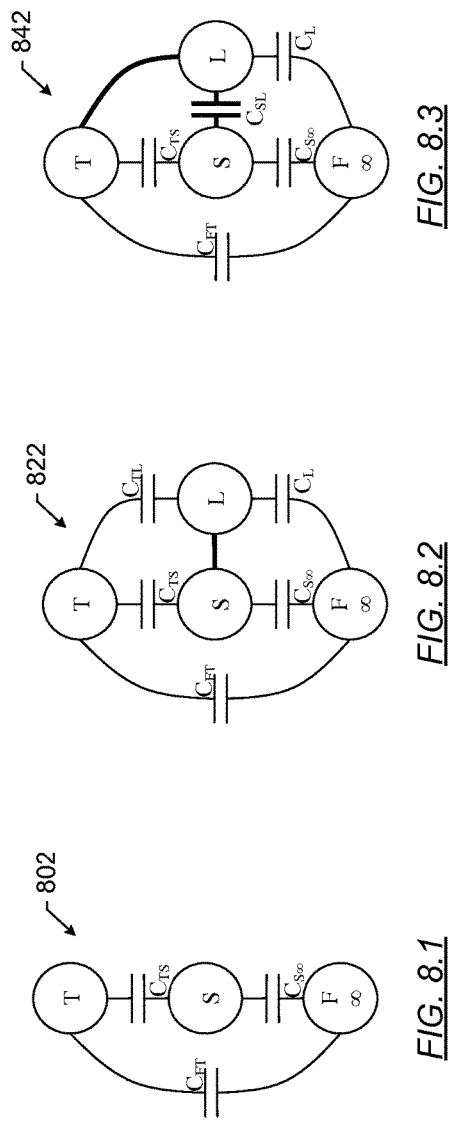
FIG. 7.3
FIG. 7.2
FIG. 7.1
FIG. 8.3
FIG. 8.2
FIG. 8.1

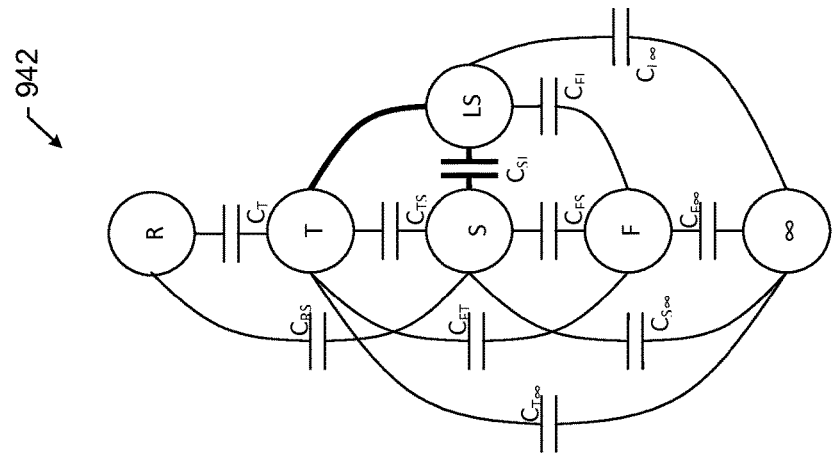
FIG. 9.3
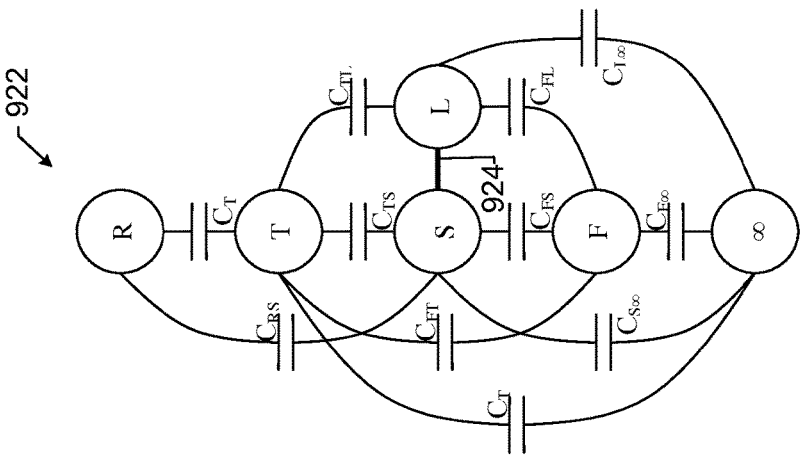
FIG. 9.2
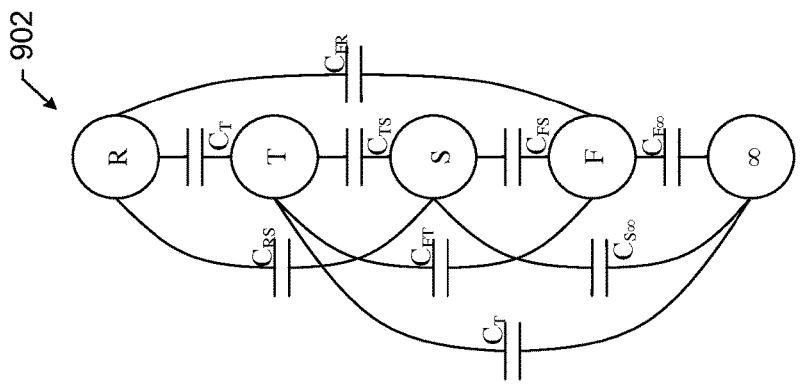
FIG. 9.1

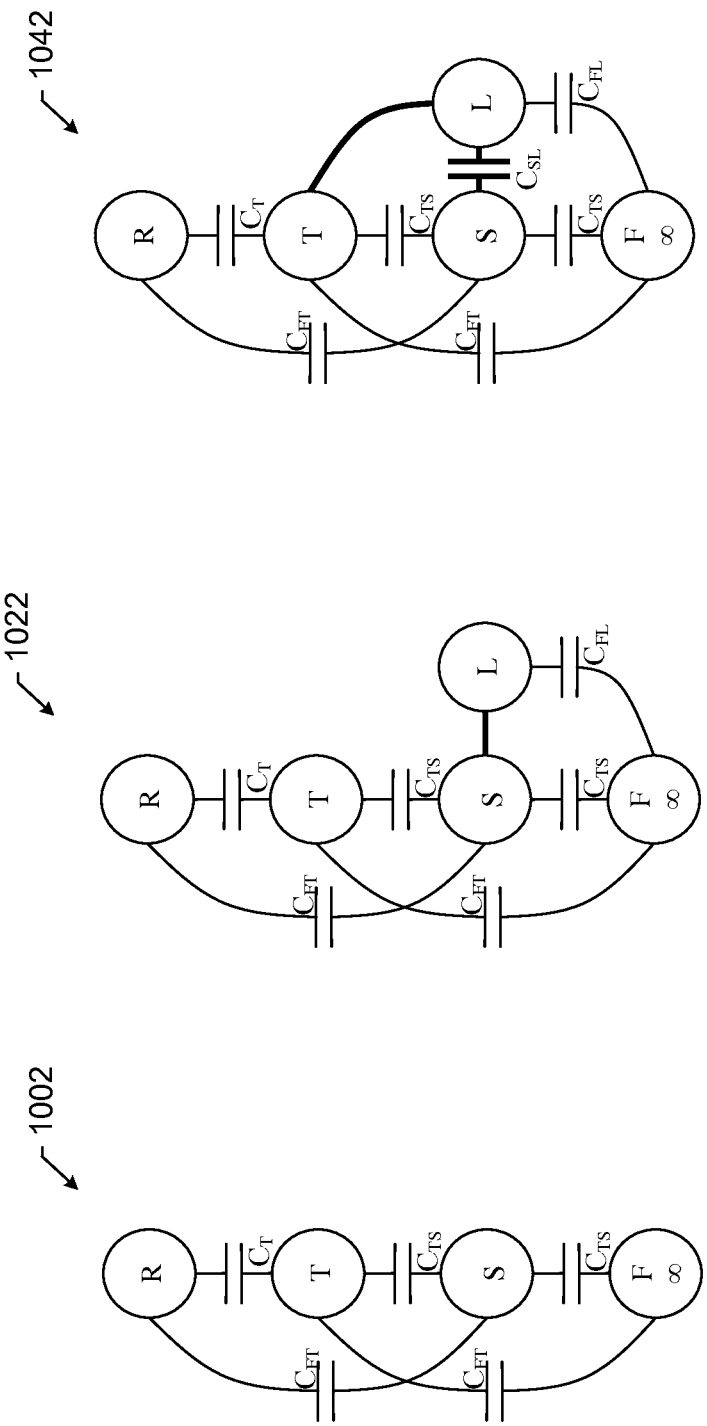

LOW GROUND MASS CORRECTION MECHANISM

FIELD OF THE INVENTION

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments of the invention relate to a processing system for an input device that includes a sensor module coupled to sensor electrodes. The sensor module includes sensor circuitry and configured to acquire first capacitive measurements when the input device is in a first state, and acquire second capacitive measurements when the input device is in a second state. The second state has an increased ground as compared to the first state. The processing system further includes a determination module configured to determine positional information for an input object based on the first capacitive measurements and the second capacitive measurements.

In general, in one aspect, embodiments of the invention relate to an input device that includes sensor electrodes configured to sense input objects in a sensing region of the input device, and a processing system. The processing system is configured to acquire first capacitive measurements when the input device is in a first state, acquire second capacitive measurements when the input device is in a second state, and determine positional information for an input object based on the first capacitive measurements and the second capacitive measurements. The second state has an increased ground as compared to the first state.

In general, in one aspect, embodiments of the invention relate to a method for capacitive sensing of an input device. The method includes acquiring first capacitive measurements when the input device is in a first state, acquiring second capacitive measurements when the input device is in a second state, and determining positional information for an input object based on the first capacitive measurements and the second capacitive measurements. The second state has an increased ground as compared to the first state.

Other aspects of the invention will be apparent from the following description and the appended claims.

BRIEF DESCRIPTION OF DRAWINGS

FIGS. 2.1-2.2 show flowcharts in accordance with one or more embodiments of the invention.

FIGS. 3, 4.1, 4.2, 5.1, 5.2, 6.1, and 6.2 show examples in accordance with one or more embodiments of the invention.

FIGS. 7.1, 7.2, 7.3, 8.1, 8.2, 8.3, 9.1, 9.2, 9.3, 10.1, 10.2, and 10.3 show example models in accordance with one or more embodiments of the invention.

DETAILED DESCRIPTION

Figure 1:
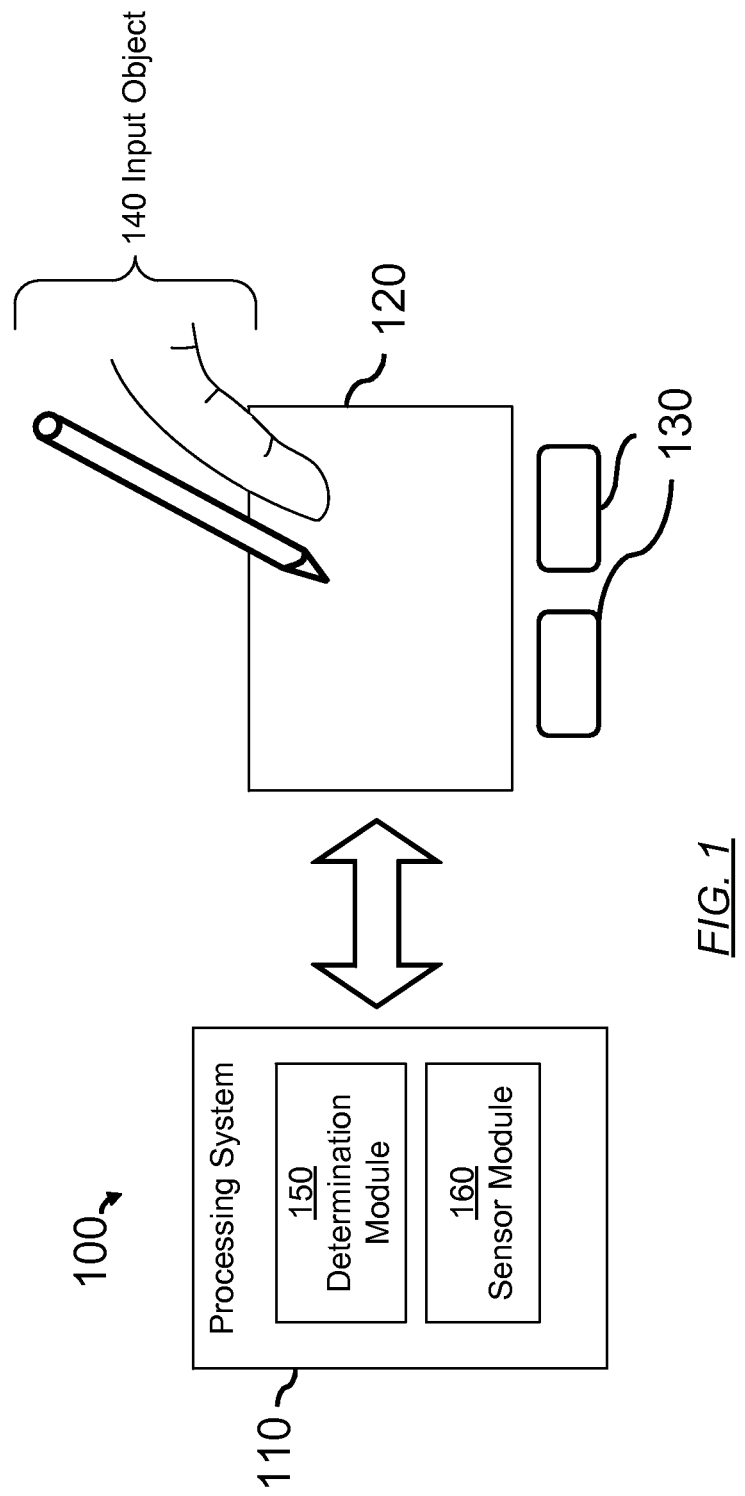
FIG. 1 shows a schematic diagram of a system in accordance with one or more embodiments of the invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is used to distinguish between the elements. By way of an example, a first element is distinct from a second element, and the first element may encompass more than one element and succeed the second element in an ordering of elements.

In general, embodiments of the invention are directed toward correcting for low ground mass. Specifically, low ground mass occurs when a capacitance input device does not have sufficient ground. For example, an input device may not have sufficient ground when the input device is on a non-conductive insulated surface and is not connected to the ground. One or more embodiments of the invention acquire capacitive measurements while an input device is in at least two different states. One of the states has a better ground than the other state. Using the at least two sets of capacitive measurements positional information is determined for any input objects in the sensing region.

In one or more embodiments of the invention, each state is a state of one or more sensing electrodes. Specifically, a state refers to a set or number of zero or more sensing electrodes that are driven with varying voltage signal and a set or number of zero or more sensing electrodes that are driven with constant voltage signal.

In one or more embodiments of the invention, the at least two different states use the same sensing method. For example, if a mutual capacitance sensing method is used when acquiring capacitive measurements during the first state, then the mutual capacitance sensing method is when acquiring capacitive measurements during the second state. By way of another example, if an absolute capacitance sensing method is used when acquiring capacitive measurements during the first state, then the absolute capacitance sensing method is when acquiring capacitive measurements during the second state.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the Specification, the singular form of input object is used. Although the singular form is used, multiple input objects exist in the sensing region (120). Further, which particular input objects are in the sensing region may change over the course of the gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

Sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a trans capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). Sensor electrodes may be dedicated transmitters or receivers, or may be configured to both transmit and receive. Measurements acquired using mutual capacitance sensing methods may be referred to as mutual capacitance measurements.

Regardless of whether mutual capacitance or absolute capacitance sensing methods are used, modulating the sensor electrodes may be referred to as driving the sensor electrode with varying voltage signal or exciting a sensor electrode. Conversely, sensor electrodes may be connected to a ground (e.g., system ground or any other ground). Connecting the sensor electrodes to a ground or holding electrodes substantially constant may be referred to a connecting the sensor electrodes to a constant voltage signal. In other words, a constant voltage signal includes a substantially constant voltage signal without departing from the scope of the invention. Further, the sensor electrodes may be of varying shapes and/or sizes. The same shapes and/or sizes of sensor electrodes may or may not be in the same groups. For example, in some embodiments, receiver electrodes may be of the same shapes and/or sizes while in other embodiments receiver electrodes may be varying shapes and/or sizes.

Some optical techniques utilize optical sensing elements (e.g., optical transmitters and optical receivers). Such optical transmitters transmit optical transmitter signals. The optical receivers include functionality to receive resulting signals from the optical transmitter signals. A resulting signal may include effect(s) corresponding to one or more transmitter signals, one or more input objects (140) in the sensing region, and/or to one or more sources of environmental interference. For example, the optical transmitters may correspond to a light emitting diode (LED), organic LED (OLED), light bulb, or other optical transmitting component. In one or more embodiments, the optical transmitter signals are transmitted on the infrared spectrum.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to sensing element(s) of input device (100), and one or more components elsewhere. For example, the input device (100) may be a peripheral coupled to a desktop computer, and the processing system (110) may include software configured to run on a central processing unit of the desktop computer and one or more ICs (perhaps with associated firmware) separate from the central processing unit. As another example, the input device (100) may be physically integrated in a phone, and the processing system (110) may include circuits and firmware that are part of a main processor of the phone. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and perform other operations.

The sensor module (160) may include functionality to drive the sensing elements to transmit transmitter signals and receive resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures such as mode changing gestures, and mode changing modules for changing operation modes.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

FIGS. 2.1 and 2.2 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 201, first capacitive measurements are acquired when the input device is in a first state in accordance with one or more embodiments of the invention. As discussed above, the state dictates which (i.e., the set) and/or how many (i.e., number) sensor electrodes are connected to a constant voltage signal and varying voltage signal during the capacitive measurement acquisition. Acquiring the capacitive measurements while the input device is in the first state may include selecting a set and/or number of sensor electrodes that are to be connected to a constant voltage signal and selecting a set and/or number of sensor electrodes that are to be connected to a varying voltage signal. The number of sensor electrode(s) that are in either set may be zero or more. Further, the sensor electrode(s) that are in either set may be a part of the sensor electrodes that perform the measurements of the sensing region (e.g., transmitting or receiving sensor electrode(s)) or separate sensor electrode(s). Mutual capacitance and/or absolute capacitance sensing methods, such as those described above, may be used to perform the acquisition. Further, the sensing region may be scanned once or multiple separate measurements may be performed to correct for noise and assist in accuracy.

In Step 203, second capacitive measurements are acquired when the input device is in a second state in accordance with one or more embodiments of the invention. In one or more embodiments of the invention, the same capacitive method is used to acquire the first capacitive measurements as the second capacitive measurements, with or without additional measurements to account for noise and assist in accuracy. In order to acquire the second capacitive measurements, the input device is switched to a second state having a different set and/or number of zero or more sensor electrodes driven with varying voltage signal and connected to constant voltage signal. The second state has an increased ground as compared to the first state in accordance with one or more embodiments of the invention. As discussed above, Steps 201 and 203 may be performed in any order. In other words, second capacitive measurements may be acquired, for example, while the input object is in the second state with the increased ground prior to acquiring the first capacitive measurements while the input object is in the first state.

In one or more embodiments of the invention, Steps 201 and 203 are performed during the same sensing frame. Each sensing frame is time window during which a single capture of the status of the sensing region with respect to the presence any input objects is performed. During a sensing frame, any and all input objects may be approximated as being stationary. In other words, the time window of the sensing frame is so short as to be effectively instantaneous to a human operator. In one or more embodiments of the invention, at the end of the frame, a report may be transmitted to other components of the processing system, input device, host system, or other device, or combination thereof. Each report includes positional information (discussed above with reference to FIG. 1) regarding any input objects in the sensing region. Thus, the Steps of FIG. 2.1, or FIG. 2.2, may be repeated for each frame in which capacitance sensing is performed.

Continuing with FIG. 2.1, a low ground mass coefficient is generated based on the first capacitive measurements and the second capacitive measurements in Step 205. In one or more embodiments of the invention, the variation between the ground when the first capacitive measurements are acquired and the second capacitive measurements are acquired is exploited to calculate a correction factor in the form of a low ground mass coefficient. Thus, although both the first capacitive measurements and the second capacitive measurements may both be acquired while the input device is in a low ground mass environment and, thus, neither correct measurements, the variation in the ground enables the correcting for low ground mass.

In Step 207, positional information is determined for any input object in the sensing region based on the low ground mass coefficient and the second capacitive measurement. In one or more embodiments of the invention, the positional information may further be determined using the first capacitive measurements. In one or more embodiments of the invention, determining positional information includes correcting the various capacitive measurements using the low ground mass coefficient for low ground mass to obtain corrected capacitive measurements.

Based on the corrected capacitive measurements, positional information is determined. Determining positional information using the corrected capacitive measurements may include, for example, adjusting the corrected capacitive measurements for the baseline capacitance (e.g., accounting for background capacitance of the input device), estimation of noise, and any other interference to identifying any input objects. Using the adjusted corrected capacitive measurements, positional information is identified for any input objects in the sensing region and positional information.

The resulting positional information may be added to a report and, the report may be transmitted to other components of the processing system, input device, host system, or other device, or combination thereof. Each report includes positional information (discussed above with reference to FIG. 1) regarding any input objects in the sensing region. Based on the positional information indicating the presence and location of one or more input objects or lack thereof, the input device and/or host system may perform a corresponding action (e.g., move a cursor, close or open an application, select or deselect an object, zoom in or zoom out, transmit information, etc.).

Returning to Steps 205 and 207, different calculations may be performed to generate a low ground mass coefficient and obtain corrected capacitive measurements. Below are examples of some of the calculations. However, other calculations may be performed without departing from the scope of the invention.

The following is an example for calculating the low ground mass coefficient when the measured capacitive measurements are absolute capacitive measurements. In the example, the following general equations may be used.

$$\Delta C_A^{(LGM_0)} = \frac{\Delta C_A C_{S\infty}^{(LGM_0)}}{\Delta C_A + C_{S\infty}^{(LGM_0)}}$$

$$\Delta C_A^{(LGM_1)} = \frac{\Delta C_A C_{S\infty}^{(LGM_1)}}{\Delta C_A + C_{S\infty}^{(LGM_1)}}$$

(Eq. 1 and 2)

In the two low-ground mass situations, $\Delta C_A^{(LGM_0)}$, $\Delta C_A^{(LGM_1)}$ are values that are the absolute capacitive values obtained from the sensor and are the distorted values. In the equations, $LGM_0$ is the sensor in the first state and $LGM_1$ is the sensor in the second state. In the good ground situation (e.g., the input device is grounded), $C_{S\infty}^{(LGM_0)} = C_{S\infty}^{(LGM_1)} = \infty$, meaning that the read $\Delta C_A^{(LGM_0)} = \Delta C_A^{(LGM_1)} = \Delta C_A$, which is the undistorted capacitance. $\Delta C_A^{(LGM_0)} = \Delta C_A^{(LGM_1)} = \Delta C_A$ may be read when the input device is known to be in a good ground. Because $\Delta C_A^{(LGM_0)}$, $\Delta C_A^{(LGM_1)}$, $\Delta C_A$ are known or are read from the sensor, $C_{S\infty}^{(LGM_0)}$, $C_{S\infty}^{(LGM_1)}$, may be extracted from Eq. 1 and 2, resulting in the following Eq. 3 and 4:

$$C_{S\infty}^{(LGM_0)} = \frac{\Delta C_A \Delta C_A^{(LGM_0)}}{\Delta C_A - \Delta C_A^{(LGM_0)}}$$

$$\Delta C_{S\infty}^{(LGM_1)} = \frac{\Delta C_A^{(LGM_1)} \Delta C_A}{\Delta C_A + \Delta C_A^{(LGM_1)}}$$

(Eq. 3 and 4)

From Eq. 3 and Eq. 4, the low-ground mass coefficient may be calculated using the following Eq. 5:

$$\alpha = \frac{C_{S\infty}^{(LGM_0)}}{C_{S\infty}^{(LGM_1)}}$$

(Eq. 5)

In Eq. 5, $\alpha$ is the low ground mass coefficient, $C_{S\infty}^{(LGM_0)}$ is the capacitance of the free space to the sensor for the first state, and $C_{S\infty}^{(LGM_1)}$ is the capacitance of the free space to the sensor for the second state.

The above is only an example. Specifically, the relationship between $C_{S\infty}^{(LGM_0)}, C_{S\infty}^{(LGM_1)}$ may not necessarily be linear in the generic case. In such an example, the low ground mass coefficient may be another function of the two capacities to free space as shown in the following Eq. 6.

$$\alpha = f(C_{S\infty}^{(LGM_0)}, C_{S\infty}^{(LGM_1)}) \tag{Eq. 6}$$

The low ground mass coefficient may be evaluated just once for a specific sensor design and sensing scheme. The low ground mass coefficient may also be extracted from simulations using the same procedure.

The following is an example equation for calculating the corrected capacitive measurements using the low ground mass coefficient when the measured capacitive measurements are absolute capacitive measurements.

$$\Delta C_A = \frac{(1-\alpha)\Delta C_A^{(LGM_0)} \Delta C_A^{(LGM_1)}}{\Delta C_A^{(LGM_1)} - \alpha \Delta C_A^{(LGM_0)}} \tag{Eq. 7}$$

In Eq. 7, $\Delta C_A$ is the corrected capacitive measurements, $\alpha$ is the low ground mass coefficient, $\Delta C_A^{LGM_0}$ is the measured capacitance at receiver electrodes using absolute capacitance sensing during the first state and may reflect change in the capacitance due to the presence of an input object, and $\Delta C_A^{(LGM_2)}$ is the measured capacitance at receiver electrodes using absolute capacitance sensing during the second state and may reflect change in the capacitance due to the presence of a input object.

As discussed above, mutual capacitance sensing method obtains a measurement for each pixel. Specifically, in mutual capacitance sensing, the sensing region is scanned to obtain a capacitive image of the sensing region. In the capacitive image, a unique pixel is located at each intersection of transmitter electrode and receiver electrode, where the transmitter electrodes are on one axis and the receiver electrodes are on another axis. As an aside, the axis in which the transmitter electrodes are located and the receiver electrodes are located may change, for example, depending on the state. Further, in some embodiments, the transmitter electrode and receiver electrode may be along the same axis or positioned in other ways, such as polar arrays, or arrays of electrodes that are all along the same axis. The following is an example for calculating the low ground mass coefficient for pixel(i,j) when the measured capacitive measurements are mutual capacitive measurements. In the example, the following general equations may be used.

$$\Delta C_{Tij}^{(LGM_0)} = \Delta C_{Tij} - \frac{C_{FTi}C_{FRj}}{C_{FTi}+C_{FRj}+C_{S\infty}^{(LGM_0)}} \tag{Eq. 8 and 9}$$

$$\Delta C_{Tij}^{(LGM_1)} = \Delta C_{Tij} - \frac{C_{FTi}C_{FRj}}{C_{FTi}+C_{FRj}+C_{S\infty}^{(LGM_1)}}$$

In the two low-ground mass situations, $\Delta C_{Tij}^{(LGM_0)}$, $\Delta C_{Tij}^{(LGM_1)}$, are values that are the mutual capacitive values read from the sensor, and are the distorted values. In the equations, $LGM_0$ is the sensor in the first state and $LGM_1$ is the sensor in the second state. In the good ground situation (e.g., the device is grounded), $C_{S\infty}^{(LGM_0)} = C_{S\infty}^{(LGM_1)} = \infty$, meaning that the read $\Delta C_{Tij}^{(LGM_0)} = \Delta C_{Tij}^{(LGM_1)} = \Delta C_{Tij}$, which is the undistorted capacitance. $\Delta C_{Tij}^{(LGM_0)} = \Delta C_{Tij}^{(LGM_1)} = \Delta C_{Tij}$ = may be read when the input device is known to be in a good ground.

Further, the values $C_{FTi}$, $C_{FRj}$ may be obtained by using the approximation from the following Eq. 10 or measured directly using the controller.

$$C_{FTi} = \beta \sum_j \Delta C_{Tij}, \quad C_{FRj} = \theta \sum_i \Delta C_{Tij}, \tag{Eq. 10}$$

$$\forall i = 0 \ldots M-1, j = 0 \ldots N-1$$

In Eq. 10, i is an iterator to iterate through transmitter electrodes, j is an iterator to iterate through receiver electrodes, $C_{FTi}$ is the capacitance between the input object and transmitter i, $C_{FRi}$ is the capacitance between the input object and receiver j, $\Delta C_{Tij}$ is the corrected mutual capacitance using mutual capacitance sensing at pixel(i,j), $\beta$ is a constant that is dependent primarily on the geometric parameters of the sensor electrodes and may be extracted using experiments or simulations, $\theta$ is a constant that is dependent primarily on the geometric parameters of the sensor electrodes and may be extracted using experiments or simulations, M is the total number of transmitters, and N is the total number of receivers.

From the above, $\Delta C_{Tij}, \Delta C_{Tij}^{(LGM_0)}, \Delta C_{Tij}^{(LGM_1)}, C_{FTi}, C_{FRj}$ are known. Thus, $C_{S\infty}^{(LGM_0)}, C_{S\infty}^{(LGM_1)}$ may be extracted from Eq. 8 and Eq. 9, resulting in the following Eq. 11 and Eq. 12.

$$C_{S\infty}^{(LGM_0)} = \frac{C_{FTi}+C_{FRj}}{\Delta C_{Tij} - \Delta C_{Tij}^{(LGM_0)}} - C_{FTi} - C_{FRj} \tag{Eq. 11 and 12}$$

$$C_{S\infty}^{(LGM_1)} = \frac{C_{FTi}+C_{FRj}}{\Delta C_{Tij} - \Delta C_{Tij}^{(LGM_1)}} - C_{FTi} - C_{FRj}$$

The low ground mass coefficient may be calculated using Eq. 13.

$$\alpha = \frac{\frac{C_{FTi}+C_{FRj}}{\Delta C_{Tij}-\Delta C_{Tij}^{(LGM_0)}} - C_{FTi} - C_{FRj}}{\frac{C_{FTi}+C_{FRj}}{\Delta C_{Tij}-\Delta C_{Tij}^{(LGM_1)}} - C_{FTi} - C_{FRj}} \tag{Eq. 13}$$

The above is only an example. Specifically, the relationship between $C_{S\infty}^{(LGM_0)}$, $C_{S\infty}^{(LGM_1)}$ may not necessarily be linear in the generic case. In such an example, the low ground mass coefficient may be another function of the two capacities to free space as shown in the following Eq. 14.

$$\alpha = f(C_{S\infty}^{(LGM_0)}, C_{S\infty}^{(LGM_1)}) \tag{Eq. 14}$$

Using the above equations, the following set of M*N quadratic equations having M*N unknown variables (i.e., $\Delta C_{Tij}$ for each transmitter i and receiver j) may be used to solve for $\Delta C_{Tij}$:

$$\frac{1}{\Delta C_{Tij} - \Delta C_{Tij}^{(LGM_1)}} - \frac{\alpha}{\Delta C_{Tij} - \Delta C_{Tij}^{(LGM_0)}} = \quad \text{(Eq. 5)}$$

$$(1-\alpha)\frac{\beta \sum_j \Delta C_{Tij} + \theta \sum_i \Delta C_{Tij}}{\beta \theta \sum_j \Delta C_{Tij} \sum_i \Delta C_{Tij}},$$

$$\forall\, i = 0 \ldots M-1,\, j = 0 \ldots N-1$$

In Eq. 5, α is the low ground mass coefficient, $\Delta C_{Tij}$ is the corrected capacitance for transmitter i and receiver j, $\Delta C_{Tij}^{(LGM_0)}$ is the measured mutual capacitance at pixel(i,j) for the first state, $\Delta C_{Tij}^{(LGM_1)}$ is the measured mutual capacitance at pixel(i,j) for the second state, i is an iterator to iterate through transmitter electrodes, j is an iterator to iterate through receiver electrodes, β is a constant described above, θ is a constant described above, M is the total number of transmitter electrodes, and N is the total number of receiver electrodes.

The above are only two examples sets of equations for obtaining corrected capacitive measurements from the first capacitive measurements and the second capacitive measurements. In the example equations, the low ground mass coefficient is generated and then used to calculate the corrected capacitive measurements. Alternative sets of equations may be used without departing from the scope of the invention.

In some embodiments of the invention, the low ground mass coefficient is not generated. FIG. 2.2 shows a flowchart that does not necessarily require calculating a low ground mass coefficient. In FIG. 2.2, Steps 251 and 253 may be performed the same as or substantially the same as Steps 201 and 203 discussed above and in reference to FIG. 2.1. In Step 255, positional information is determined using the first capacitive measurements and second capacitive measurements. Determining the positional information in FIG. 2.2 may be performed by performing Steps 205 and 207 discussed above with reference to FIG. 2.1. Alternatively, determining the positional information in FIG. 2.2 may be performed by performing Step 207 discussed above with reference to FIG. 2.1 with the following modification. Rather than calculating the low ground mass coefficient, the following matrix multiplication may be used.

$$X = K^{-1}D \quad \text{(Eq. 6)}$$

In Eq. 6, X is an M*N matrix of corrected capacitive measurements where M is the number of transmitters and N is the number of receivers, K is a constant matrix representing the background capacitances of the sensing region, $K^{-1}$ is the inverse of the constant matrix, and D is a combined matrix of having the first capacitive measurements and the second capacitive measurements. In particular, the constant matrix is a matrix of the total capacitances of the sensor electrodes without any input device in the sensing region. For example, the total capacitance of a sensor electrode may be the capacitance of the sensor electrode with respect to free space, with respect to one or more other sensor electrodes, etc.

Figure 3:
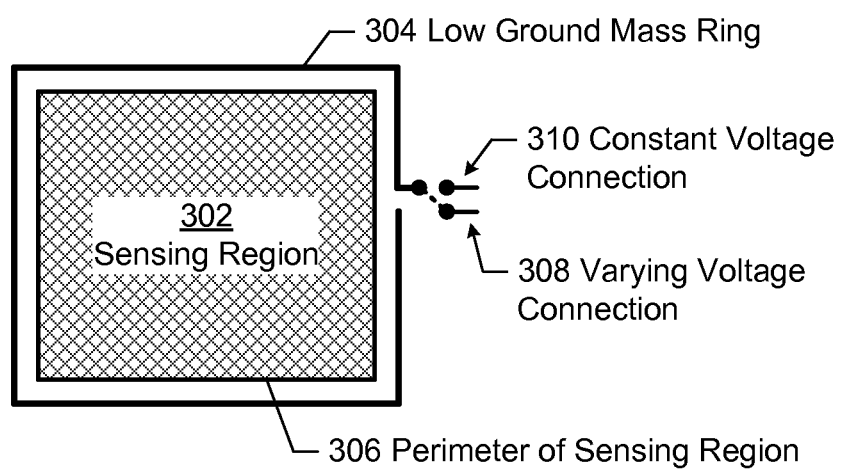

The various techniques described above correct for low ground mass by having a different grounding scenario during different states. In other words, when the capacitive measurements are acquired, low ground mass may exist regardless of the state and the capacitive measurements may be incorrect. FIGS. 3, 4.1, 4.2, 5.1, 5.2, 6.1, and 6.2 show examples in accordance with one or more embodiments of the invention.

FIG. 3 shows an example sensing region (302) that uses a low ground mass ring (304) in accordance with one or more embodiments of the invention. Sensor electrodes (not shown) are located around the perimeter (306) of the sensing region (302). The sensor electrodes are used to measure the capacitance of the sensing region (302). In some embodiments of the invention, the sensor electrodes may acquire the capacitive measurements without a consideration of the state. In other words, the sensor electrodes perform normal operation of capacitive sensing during each state. In some embodiments of the invention, the sensor electrodes may acquire the capacitive measurements using other techniques for changing the ground in addition to the low ground mass ring (304), such as the techniques described in FIGS. 4.1, 4.2, 5.1, 5.2, 6.1, and 6.2.

The low ground mass ring (304) is a ring electrode that is around a perimeter of the sensor electrodes. The low ground mass ring (304) may be, for example, an electromagnetic interference (EMI) ring, such as an EMI ring that is used to prevent electromagnetic interference. Alternatively or additionally, the low ground mass ring may be another ring electrode around the perimeter of the sensor electrodes.

During the first state, the low ground mass ring (304) is connected to a varying voltage connection (308). In other words, the low ground mass ring (304) is driven by the varying voltage connection (308) with a varying voltage signal. During the second state, the low ground mass ring (304) is connected to a constant voltage connection (310). In other words, the low ground mass ring (310) is connected by the constant voltage connection (310) to a constant voltage signal. The constant voltage connection (310) may be, for example, a system ground of the input device. In one or more embodiments of the invention, driving the low ground mass ring with the varying voltage signal creates a worse low ground mass condition than not having the low ground mass ring or connecting the low ground mass ring to a constant voltage signal. However, the difference in the ground conditions may be used as discussed above to correct for low ground mass that may be present while input device is in either state.

Although FIG. 3 shows using a low ground mass ring, in some embodiments of the invention, another electrode or collection of electrodes proximate to the sensor electrodes may be used. In other words, such other electrode(s) is distinct from the sensor electrodes and is driven with a varying voltage signal or connected to a constant voltage signal, depending on the state. The electrode(s) may be located, for example, next to one or more of the sensor electrodes or in another location.

FIGS. 4.1 and 4.2 show another example technique for changing the state of the input device in accordance with one or more embodiments of the invention. In the example in FIGS. 4.1 and 4.2, absolute capacitance measurements are acquired. However, rather than acquiring the absolute capacitance measurements for both axis of the sensing region at the same time, the absolute capacitive measurements are acquired for each axis at different times.

By way of background, in absolute capacitance sensing, transceiver electrodes, or an electrode that includes a transmitter electrode and a receiver electrode and, thus, both transmit and receive sensing signals, are located on both axis of the sensing region. The electrodes may be the same or different sizes and/or shapes. The transceiver electrodes on one axis transmit a transmitter signal at the same time and the resulting signal is received on the other axis. The result of the transmission is a profile along an axis of the sensing region. By performing the operation whereby both axis transmit and receive, a profile is generated for each axis.

Continuing with the example, FIG. 4.1 shows absolute capacitive measurement at a first time (e.g., time $t_1$ (402)). As shown in FIG. 4.1, at the first time, the vertical axis of the sensing region (404) is a constant voltage axis (406), while the horizontal axis of the sensing region (404) is an exited axis (408). In other words, the set of sensor electrodes along the existed axis (408) is driven with a varying voltage signal and, thus, transmits sensing signals. The set of sensor electrodes along the constant voltage axis (406) is connected to a constant voltage connection, such as a system ground. In other words, the set of sensor electrodes on the constant voltage axis (406) only receive resulting signals from the sensing signals of the exited axis (408) and do not transmit in accordance with one or more embodiments of the invention.

FIG. 4.2 continues the example by showing absolute capacitive measurement at a second time (e.g., time $t_2$ (410)), which is different than the first time. As shown in FIG. 4.2, at the second time, the horizontal axis of the sensing region (404) is a constant voltage axis (412), while the vertical axis of the sensing region (404) is an exited axis (414). Although the example shows a specific arrangement of electrodes along the vertical and horizontal axis, in other embodiments, different layout and relationships between electrodes may be used. As with FIG. 4.1, the set of sensor electrodes along the existed axis (412), which is now the vertical axis, is driven with a varying voltage signal and, thus, transmits transmitter signals. The set of sensor electrodes along the constant voltage axis (414), which is now the horizontal axis, is connected to a constant voltage connection, such as a system ground or a reference voltage. In other words, set of sensor electrodes along the constant voltage axis (412) only receive resulting signals from the sensing signals of the exited axis (414) and do not transmit in accordance with one or more embodiments of the invention.

As shown in FIGS. 4.1 and 4.2, in the example, the state dictates which axis or set of sensor electrodes is driven with varying voltage signal and which axis or set of sensor electrodes is connected to the ground or a reference voltage. In one or more embodiments of the invention, ultimately, a profile is obtained from both axes during the sensing frame in order to obtain the capacitance and identify input objects in the sensing region. However, by measuring the capacitance for each axis at different times, different amount of ground exist at each time. The different amounts may be used to correct for low ground mass as discussed above.

FIGS. 5.1 and 5.2 show another example technique for changing the state of the input device in accordance with one or more embodiments of the invention. In the example in FIGS. 5.1 and 5.2, mutual capacitance measurements are acquired by performing multiple scans using different numbers of exited rows and constant voltage rows during each scan.

By way of background, mutual capacitance sensing generally involves scanning the sensing region. Transmitters on one axis transmit sensing signals which are received by receivers on a receiver axis in accordance with one or more embodiments of the invention. Each transmitter may transmit on a particular row. In some embodiments, transmitters transmit one at a time and one after the other, thereby, scanning the sensing region. The result of the scanning is that a capacitive image is created by the time that the last transmitter completes transmitting and the resulting signals received. In other embodiments, multiple transmitters may transmit at the same time, such as by using code division multiplexing. For example, four transmitters may transmit at the same time during the scanning while the remaining number of rows is connected to a constant voltage signal.

FIG. 5.1 shows an example mutual capacitance scanning of the sensing region (502) at a first time period (e.g., time period $t_1$) (504) in accordance with one or more embodiments of the invention. In the example, a single row is exited (e.g., excited row (506), exited row (508)) at each time as shown by the darkened section. In other words, the sensor transmitter electrode for the excited row is driven with a varying voltage signal. Which transmitter electrode is transmitting changes over the course of the time period to perform the scanning of the sensing region. The remaining rows that are not currently transmitting are constant voltage rows (e.g., constant voltage rows (510), constant voltage rows (512)). In the constant voltage rows, the transmitter electrodes are connected to a constant voltage signal, such as a system ground or a reference voltage. Each receiver electrode along the receiver axis (514) receives resulting signals during the scanning.

FIG. 5.2 shows an example mutual capacitance scanning of the sensing region (502) at a second time period (e.g., time period $t_2$) (524) in accordance with one or more embodiments of the invention. In the example, multiple rows are exited (e.g., excited rows (526), exited rows (528)) at each time as shown by the darkened section. In other words, the sensor transmitter electrodes for the excited rows are driven with a varying voltage signal. Which transmitter electrodes are transmitting changes over the course of the time period to perform the scanning of the sensing region. The remaining row that is not currently transmitting is a constant voltage rows (e.g., constant voltage rows (530), constant voltage rows (532)). In the constant voltage row, the transmitter electrode is connected to a constant voltage signal, such as a system ground or a reference voltage. Each receiver electrode along the receiver axis (514) receives resulting signals during the scanning.

As shown in FIGS. 5.1 and 5.2, in the example, the state dictates the number of sensor electrodes that are driven with varying voltage signal and the number of sensor electrodes that are connected to the constant voltage signal during the scanning of the sensing region. In one or more embodiments of the invention, at least two scans of the sensing region is performed whereby different numbers of sensor electrodes are driven with varying voltage signals and different number of sensor electrodes are connected to the system ground. By performing the two scans with different numbers of sensor electrodes excited and connected to the ground or a reference voltage, different amount of ground exist at each state. The different amounts may be used to correct for low ground mass as discussed above.

Further, although FIG. 5.1 shows a single exited row at a time and the remaining rows constant voltage rows while FIG. 5.2 shows a single constant voltage row and the remaining rows excited, the numbers may be generalized as follows. In one or more embodiments of the invention, during the first state, a first number of one or more rows (i.e., a first number of sensor electrodes on the rows) are excited and a second number (i.e., a second number of sensor electrodes on the rows) of one or more rows are constant voltage rows, whereby the first number does not equal or is different than the second number. During the second state, a third number of one or more rows (i.e., a third number of sensor electrodes on the rows) are excited and a fourth number of one or more rows (i.e., a fourth number of sensor electrodes on the rows) are constant voltage rows, whereby the third number does not equal or is different than the fourth number, the third number is different than the first number, and the fourth number is different than the second number.

FIGS. 6.1 and 6.2 show another example technique for changing the state of the input device in accordance with one or more embodiments of the invention. In the example in FIGS. 6.1 and 6.2, absolute capacitance measurements are acquired using different electrodes for each state.

FIG. 6.1 shows an example side perspective view of the sensing region (602) during the measurement at a first time (e.g., time $t_1$) (604). During the first time, the electrodes selected to be the receiver electrodes (608) have less total surface area than the electrodes selected to be the transmitter electrodes (610). In other words, the electrodes with the greater total surface area transmit transmitter signals as transmitter electrodes (610) while the electrodes with less total surface area receive resulting signals as receiver electrodes (608). The transmission and receipt of sensing signals during the measurement at the first time (604) correspond to acquiring capacitive measurements while the input object is in the first state.

FIG. 6.2 shows an example side perspective view of the sensing region (602) during the measurement at a second time (e.g., time $t_2$) (620). During the second time, the electrodes selected to be the receiver electrodes (624) have greater total surface area than the electrodes selected to be the transmitter electrodes (622). In other words, the electrodes with less total surface area transmit transmitter signals as transmitter electrodes (622) while the electrodes with greater total surface area receive resulting signals as receiver electrodes (624). The transmission and receipt of sensing signals during the measurement at the second time (620) correspond to acquiring capacitive measurements while the input object is in the second state.

As shown in FIGS. 6.1 and 6.2, the actual physical configuration of the various electrodes does not change between states. However, the set of electrodes that are used as transmitter electrodes or receiver electrodes do change. In other words, the state dictates which set of electrodes transmit and which set of electrodes receive. By using electrodes having different surface areas to perform the scanning between acquisitions of capacitive measurements, different amount of ground exist at each state. The different amounts may be used to correct for low ground mass as discussed above.

Although FIGS. 6.1 and 6.2 show the different electrodes as being one above the other, the different electrodes may be organized in virtually any manner. For example, the electrodes may be on the opposite side of the same substrate, on the same substrate, using jumpers to not overlap, on different layers, etc. Further, the electrodes may be of differing sizes and/or shapes even in the set of electrodes that are selected to be transmitter electrodes for the first state, even in the set of electrodes that are selected to be receiver electrodes for the first state, etc.

As discussed above with reference to FIG. 3, an example technique to have multiple states and acquire measurements for each state is to use a low ground mass ring that is around the perimeter of the sensor electrodes. FIGS. 7.1, 7.2, 7.3, 8.1, 8.2, 8.3, 9.1, 9.2, 9.3, 10.1, 10.2, and 10.3 show modeling schematics for different states in accordance with one or more embodiments of the invention.

FIGS. 7.1, 7.2, and 7.3 show modeling schematics for correcting for low ground mass using a low ground mass ring around the sensor when absolute capacitance sensing is performed. In the modeling schematics, "T" is the transceiver electrode, "S" is the system ground, "F" is the input object, "L" is the low ground mass ring, and "∞" is the reference ground (e.g., Earth or free space), $C_{T\infty}$ is the capacitance of the transceiver electrode to the referenced ground, $C_{FT}$ is the capacitance of the input object to the transceiver electrode, $C_{S\infty}$ is the capacitance of the system ground to the referenced ground, $C_{TS}$ is the capacitance of the transceiver electrode to the system ground, $C_{FS}$ is the capacitance of the input object to the system ground, $C_{TL}$ is the capacitance of the transceiver electrode to the low ground mass ring or other grounding mechanism to change the state the grounding mechanism, $C_{FL}$ is the capacitance of the input object to the grounding mechanism, $C_{L\infty}$ is the capacitance of the grounding mechanism to the referenced ground, $C_{SL}$ is the capacitance of the system ground to the grounding mechanism.

FIG. 7.1 shows a modeling schematic (702) without allowing for multiple states. As shown in FIG. 7.1, various capacitances exist between the transceiver electrode, system ground, input object, and referenced ground. FIG. 7.2 shows a shows a modeling schematic (722) with a grounded low ground mass ring. As shown by the dark unbroken line (724) between "S" and "L", the low ground mass ring is connected to the system ground providing a first state for acquiring absolute capacitance measurements. In other words, with the grounded low ground mass ring, a change in capacitance exists between the transceiver electrode and the low ground mass ring. FIG. 7.3 shows a modeling schematic (742) with an exited low ground mass ring. In other words, with the excited low ground mass ring, a change in capacitance exists between the system ground and the low ground mass ring.

FIGS. 8.1., 8.2, and 8.3 show simplified schematic diagrams of FIGS. 7.1, 7.2, and 7.3, respectively. In the simplified schematic diagrams, the capacities of the input object and the referenced ground are assumed to be the same. FIG. 8.1 shows a simplified modeling schematic (802) without allowing for multiple states. FIG. 8.2 shows a shows a simplified modeling schematic (822) with a grounded low ground mass ring. FIG. 8.3 shows a simplified modeling schematic (842) with an exited low ground mass ring.

FIGS. 9.1, 9.2, 9.3, 10.1, 10.2, and 10.3 show modeling schematics for correcting for low ground mass using a low ground mass ring around the sensor when mutual capacitance sensing is performed. In the modeling schematics, "T" is the transmitter electrode, "R" is the receiver electrode, "S" is the system ground, "F" is the input object, "L" is the low ground mass ring, and "∞" is the reference ground (e.g., Earth or free space), $C_T$ is the capacitance of the transmitter, $C_{T\infty}$ is the capacitance of the transmitter to the referenced ground, $C_{RS}$ is the capacitance of the receiver to the system ground, $C_{FR}$ is the capacitance of the input object to the receiver, $C_{FT}$ is the capacitance of the input object to the transmitter, $C_{S\infty}$ is the capacitance of the system ground to the referenced ground, $C_{TS}$ is the capacitance of the transmitter to the system ground, $C_{FS}$ is the capacitance of the input object to the system ground, $C_{F\infty}$ is the capacitance of the input object to the referenced ground, $C_{TL}$ is the capacitance of the transmitter to the low ground mass ring or other grounding mechanism to change the state the grounding mechanism, $C_{FL}$ is the capacitance of the input object to the grounding mechanism, $C_{L\infty}$ is the capacitance of the grounding mechanism to the referenced ground, $C_{SL}$ is the capacitance of the system ground to the grounding mechanism.

FIGS. 9.1 shows a modeling schematic (902) without allowing for multiple states. As shown in FIG. 9.1, various capacitances exist between the transmitter, system ground, input object, and referenced ground. FIG. 9.2 shows a shows a modeling schematic (922) with a grounded low ground mass ring. As shown by the dark unbroken line (924) between "S" and "L", the low ground mass ring is connected to the system ground providing a first state for acquiring absolute capacitance measurements. In other words, with the grounded low ground mass ring, a change in capacitance exists between the transmitter and the low ground mass ring. FIG. 9.3 shows a modeling schematic (942) with an exited low ground mass ring. In other words, with the excited low ground mass ring, a change in capacitance exists between the system ground and the low ground mass ring.

FIGS. 10.1., 10.2, and 10.3 show simplified schematic diagrams of FIGS. 9.1, 9.2, and 9.3, respectively. In the simplified schematic diagrams, the capacities of the input object and the referenced ground are assumed to be the same. FIG. 10.1 shows a simplified modeling schematic (1002) without allowing for multiple states. FIG. 10.2 shows a shows a simplified modeling schematic (1022) with a grounded low ground mass ring. FIG. 10.3 shows a simplified modeling schematic (1042) with an exited low ground mass ring.

Although the above discussion and examples shown in FIGS. 7.1, 7.2, 7.3, 8.1, 8.2, 8.3, 9.1, 9.2, 9.3, 10.1, 10.2, and 10.3 are schematic models for a low ground mass ring where L is the low ground mass ring, the same or similar models may be used where L is another grounding mechanism that changes the states.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for an input device comprising:
a sensor module configured to be coupled to a plurality of sensor electrodes, the plurality of sensor electrodes comprising a plurality of transmitter electrodes and a plurality of receiver electrodes, the sensor module comprising sensor circuitry and configured to:
acquire a first plurality of capacitive measurements when the input device is in a first state, wherein acquiring the first plurality of capacitive measurements when the input device is in the first state comprises sequentially driving every one of the plurality of transmitter electrodes with a varying voltage signal,
wherein, when sequentially driving in the first state, a first number of the plurality of transmitter electrodes are driven with the varying voltage signal at a same time while a second number of the plurality of transmitter electrodes are grounded at the same time, wherein the first number is different than the second number, and
acquire a second plurality of capacitive measurements when the input device is in a second state, wherein acquiring the second plurality of capacitive measurements when the input device is in the second state comprises sequentially driving every one of the plurality of transmitter electrodes with the varying voltage signal,
wherein, when sequentially driving in the second state, a third number of the plurality of transmitter electrodes are driven with the varying voltage signal at a same time while a fourth number of the plurality of transmitter electrodes are grounded at the same time, wherein the third number is different than the first number, the third number is different than the fourth number, and the fourth number is different than the second number; and
a determination module comprising circuitry configured to:
determine positional information for an input object based on the first plurality of capacitive measurements and the second plurality of capacitive measurements.

2. The processing system of claim 1, wherein the determination module is further configured to:
generate a low ground mass coefficient based on the first plurality of capacitive measurements and the second plurality of capacitive measurements, the low ground mass coefficient being a correction factor to correct for low ground mass,
wherein the positional information is determined using the low ground mass coefficient.

3. An input device comprising:
a plurality of sensor electrodes configured to sense input objects in a sensing region of the input device, the plurality of sensor electrodes comprising a plurality of transmitter electrodes and a plurality of receiver electrodes; and
a processing system configured to:
acquire a first plurality of capacitive measurements when the input device is in a first state, wherein acquiring the first plurality of capacitive measurements when the input device is in the first state comprises sequentially driving every one of the plurality of transmitter electrodes with a varying voltage signal,
wherein, when sequentially driving in the first state, a first number of the plurality of transmitter electrodes are driven with a varying voltage signal at a same time while a second number of the plurality of transmitter electrodes are grounded at the same time, wherein the first number is different than the second number,
acquire a second plurality of capacitive measurements when the input device is in a second state, wherein acquiring the second plurality of capacitive measurements when the input device is in the second state comprises sequentially driving every one of the plurality of transmitter electrodes with the varying voltage signal,
wherein, when sequentially driving in the second state, a third number of the plurality of transmitter electrodes are driven with the varying voltage signal at a same time while a fourth number of the plurality of transmitter electrodes are grounded at the same time, wherein the third number is different than the first number, the third number is different than the fourth number, and the fourth number is different than the second number, and
determine positional information for an input object based on the first plurality of capacitive measurements and the second plurality of capacitive measurements.

4. The input device of claim 3, wherein the processing system is further configured to:
generate a low ground mass coefficient based on the first plurality of capacitive measurements and the second plurality of capacitive measurements, the low ground mass coefficient being a correction factor to correct for low ground mass, wherein the positional information is determined using the low ground mass coefficient.

5. A method for capacitive sensing of an input device, the method comprising:

acquiring a first plurality of capacitive measurements when the input device is in a first state, wherein acquiring the first plurality of capacitive measurements when the input device is in the first state comprises sequentially driving every one of a plurality of transmitter electrodes with a varying voltage signal, wherein, when sequentially driving in the first state, a first number of the plurality of transmitter electrodes driven with a varying voltage signal at a same time while a second number of the plurality of transmitter electrodes are grounded at the same time, wherein the first number is different than the second number;

acquiring a second plurality of capacitive measurements when the input device is in a second state, wherein acquiring the second plurality of capacitive measurements when the input device is in the second state comprises sequentially driving every one of the plurality of transmitter electrodes with the varying voltage signal, wherein, when sequentially driving in the second state, a third number of the plurality of transmitter electrodes are driven with the varying voltage signal at a same time while a fourth number of the plurality of transmitter electrodes are grounded at the same time, wherein the third number is different than the first number, the third number is different than the fourth number, and the fourth number is different than the second number; and determining positional information for an input object based on the first plurality of capacitive measurements and the second plurality of capacitive measurements.

6. The method of claim 5, further comprising:

generating a low ground mass coefficient based on the first plurality of capacitive measurements and the second plurality of capacitive measurements, the low ground mass coefficient being a correction factor to correct for low ground mass, wherein the positional information is determined using the low ground mass coefficient.

\* \* \* \* \*